(12) United States Patent
Aubert et al.

(10) Patent No.: US 7,631,612 B2
(45) Date of Patent: Dec. 15, 2009

(54) DEVICE FOR MODIFYING THE HULL OF A FLOATING BODY

(75) Inventors: Henri Aubert, Sanary (FR); Elisabeth Richeux, La Ciotat (FR)

(73) Assignee: Constructions Industrielles de la Mediterranee - CNIM, Paris (FR)

( * ) Notice: Subject to any disclaimer, the term of this patent is extended or adjusted under 35 U.S.C. 154(b) by 0 days.

(21) Appl. No.: 11/570,359

(22) PCT Filed: Sep. 21, 2006

(86) PCT No.: PCT/FR2006/002163

§ 371 (c)(1),
(2), (4) Date: Mar. 2, 2007

(87) PCT Pub. No.: WO2008/034955

PCT Pub. Date: Mar. 27, 2008

(65) Prior Publication Data

US 2009/0038527 A1   Feb. 12, 2009

(51) Int. Cl.
*B63B 7/00* (2006.01)

(52) U.S. Cl. .......................... 114/354; 114/266; 14/27

(58) Field of Classification Search ............... 440/12.5, 440/12.56, 12.63, 12.64; 14/27; 114/284, 114/354, 353, 266, 267, 68, 123, 283, 292, 114/77 A, 77 R, 85

See application file for complete search history.

(56) References Cited

U.S. PATENT DOCUMENTS 4,730,574 A  3/1988 Diefendahl et al.
5,649,333 A * 7/1997 Chernjawski ............ 14/27
2005/0145157 A1  7/2005 Choi

FOREIGN PATENT DOCUMENTS

DE   3204473 A1 * 8/1983
EP   0 290 405 A1   9/1988
FR   2 576 554 A1   8/1986
GB   2 393 691 A   7/2004

\* cited by examiner

*Primary Examiner*—Ed Swinehart
(74) *Attorney, Agent, or Firm*—Leydig, Voit & Mayer, LTD.

(57) ABSTRACT

A device for modifying a hull of a floating body of a floating vehicle or floating bridge, having a base floating body, with an upper surface forming a principal rolling path, and first and second lateral surfaces. On each side of the base floating body, a first movable wall which is mounted so that it pivots on a lower part of the corresponding lateral surface of the base floating body, a second movable wall is mounted so that it pivots on the first movable wall, and a third movable wall is mounted so that it pivots about the second movable wall The three movable walls are arranged with respect to each other so that, in a folded position, the first movable wall is essentially parallel to the first lateral surface of the base floating body, and the second and third movable walls partially cover the upper surface of the base floating body. In a deployed position, the first movable wall delimits a volume between itself and the first lateral surface, the second movable wall extends the first movable wall and the third movable wall forms an additional path broadening the upper surface.

11 Claims, 3 Drawing Sheets

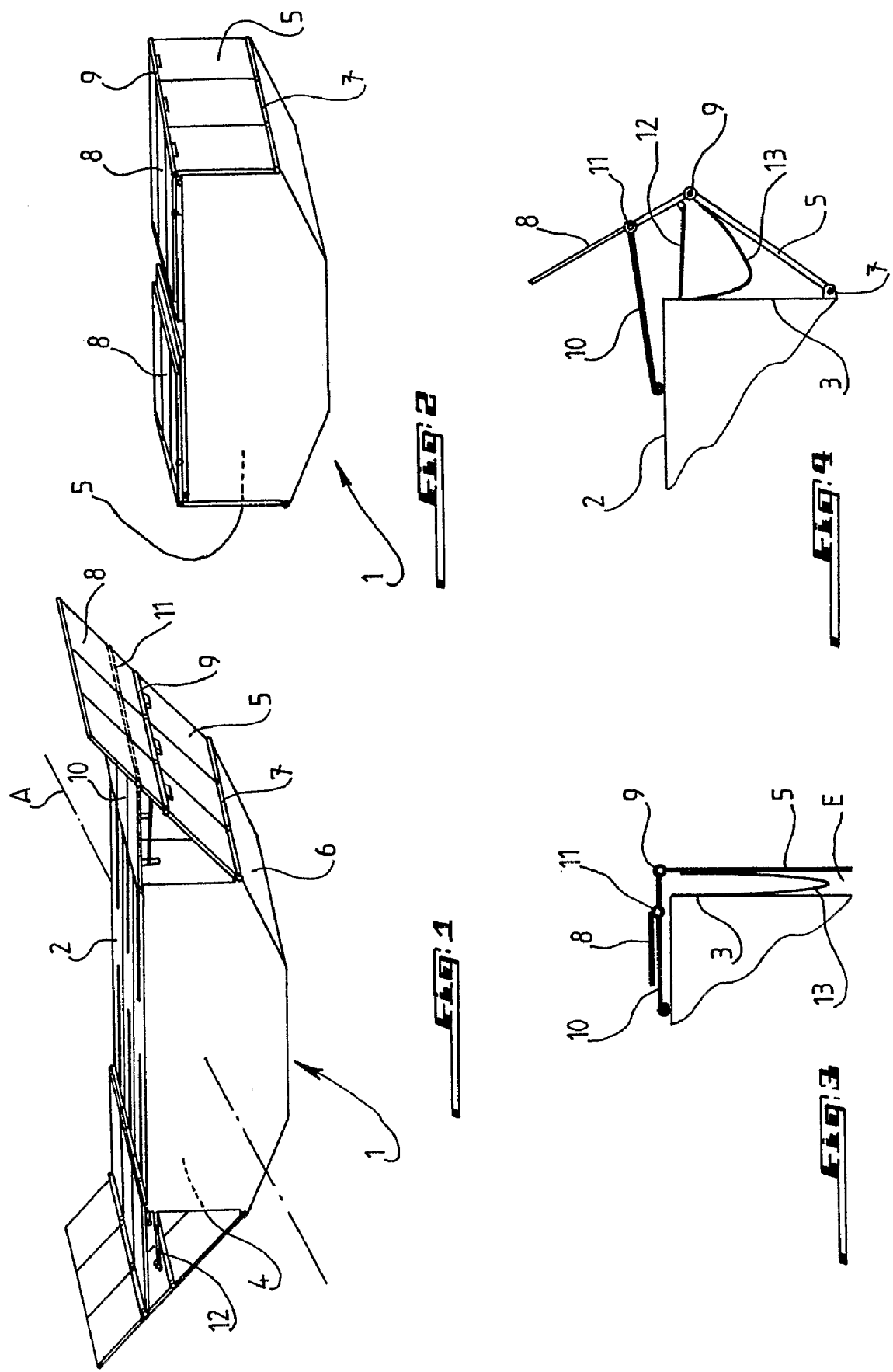

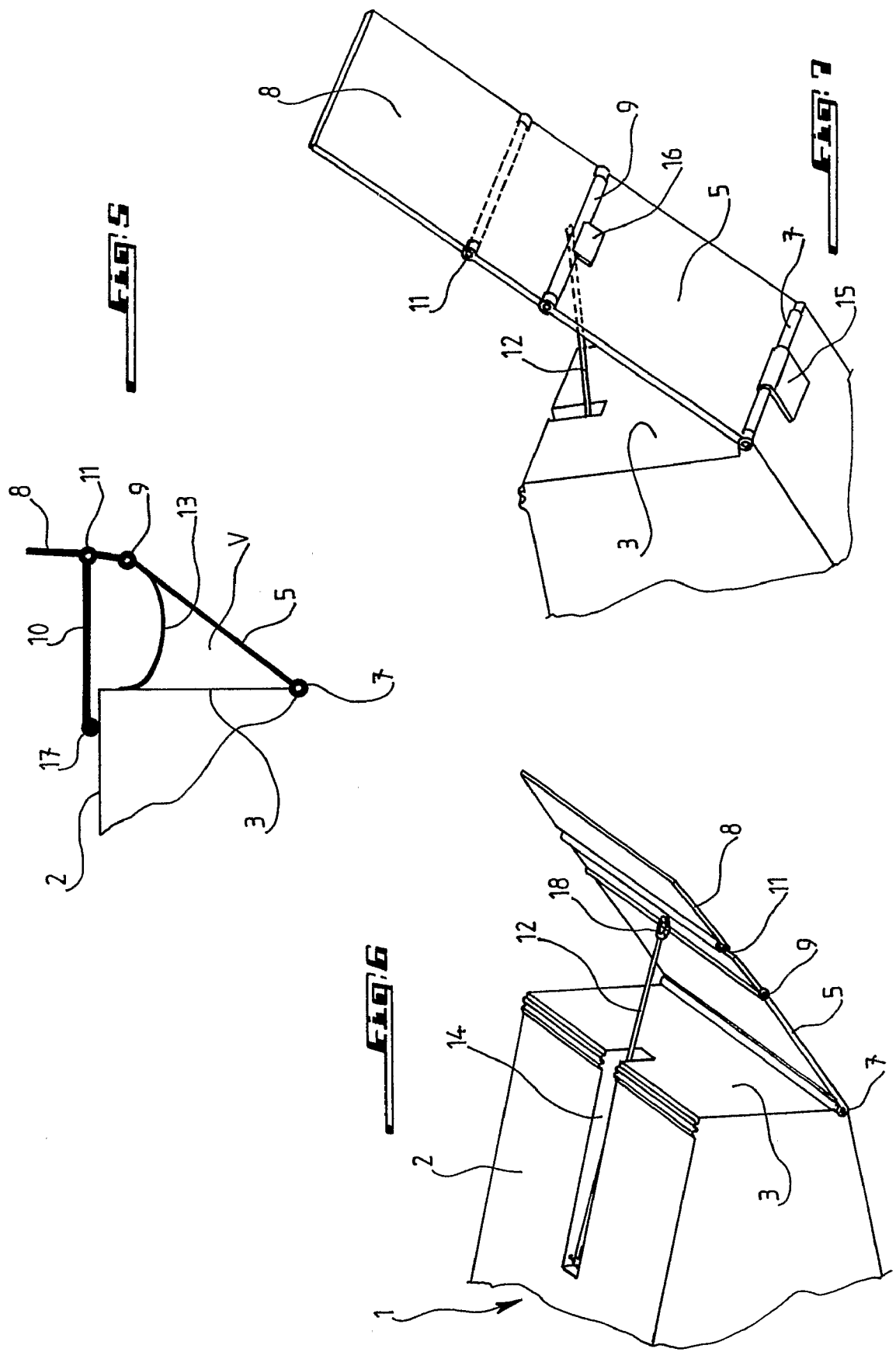

DEVICE FOR MODIFYING THE HULL OF A FLOATING BODY

FIELD OF THE INVENTION

Figure 8:
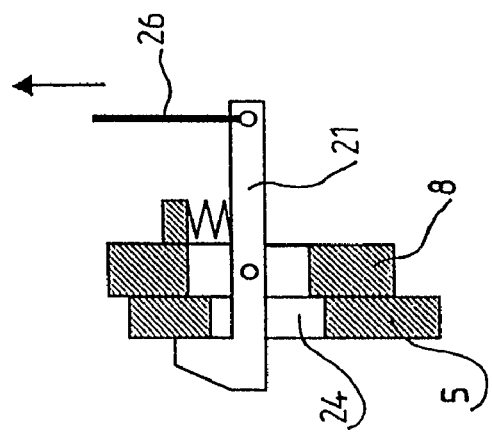

The present invention relates to a device for modifying the hull of a floating body which is part of a floating vehicle or floating bridge, as well as an amphibious vehicle comprising such a device.

The device of the invention is applied primarily, but not exclusively, in military engineering and, more specifically, in the design of floating bridges or of pontoons.

BACKGROUND

Systems that are intended to be used, alone or in combination with other systems of the same design, such as floating bridges or pontoons, must be such that they can be used satisfactorily and, to the extent possible, in an equivalent manner both in the water and on solid ground. They also must be able to cross wet breaches and, especially without external help, the boundary region between water and solid ground, such as embankments or river shores. Finally, these systems, which are intended to form floating bridges or pontoons, must be capable of withstanding different types of static and dynamic loads, depending on whether they are used as a floating bridge or as a pontoon.

When such systems are used in or on the water, that is, as a pontoon or as a floating bridge, it is desirable for them to have the largest possible dimensions in terms of a circulation surface or a platform for transport or loading, to be able to handle the greatest number of personnel or materials as rapidly and as economically as possible. At the same time, when these systems must move over solid ground, the traffic code or similar regulations, and practical aspects in terms of dimensions and weight place limits on the dimensions of such systems.

One type of solution to this problem consists, as implicitly indicated above and already extensively used, of forming floating bridges or pontoons from a plurality of systems of the same design. This solution makes it possible to comply easily with the constraints of moving these systems on solid ground, and, at the same time, it opens nearly limitless possibilities in terms of dimensions for both floating bridges and pontoons.

However, when one uses systems designed from a plurality of individual systems, a situation that is frequently encountered is that the combination of two or more complete systems would result in a floating bridge or a pontoon that is too large, and it would therefore be desirable to have a system of smaller modules and to be able to combine it with one or more full-sized systems.

A first possibility of varying the dimensions of the systems for a floating bridge or pontoon consists of increasing the width of a floating system, for example, to clear a pedestrian path, to be able to move more easily around the vehicle or any object placed on or circulating on the floating system. Such an enlargement is achieved, for example, by arranging rolling pats on the floaters of the system, or by the manual addition of circulation surfaces when needed. To ensure the security of the personnel that will circulate such an enlarged system, it was necessary to experiment with raised boards or other manually deployed means.

SUMMARY OF THE INVENTION

The objective of the invention is to propose a solution which allows a certain dimensional flexibility for a floating system.

The objective of the invention is achieved with a device for modifying the hull of a floating body forming part of a floating vehicle or floating bridge, which has a base floating body with an upper surface forming the principal rolling path and two lateral surfaces.

According to the invention, the device comprises, on each side of the base floating body, a first movable wall which is mounted so that it pivots on a lower part of the corresponding lateral surface of the base floating body about a first axle, a second movable wall which is mounted so that it pivots on the first movable wall about a second axle, and a third movable wall which is mounted so that it pivots about the second movable wall about a third axle, where the three axles are parallel to each other and to a longitudinal axis of the principal rolling path, and the three movable walls are arranged with respect to each other in such a manner that, in the folded position, the first movable wall is arranged essentially parallel to the lateral surface of the base floating body and the second and third movable walls partially cover the upper surface of the base floating body, and, in the deployed position, the first movable wall delimits a volume between it and the lateral surface, the second movable wall extends the first movable wall, and the third movable wall forms an additional path broadening the upper surface.

Thanks to the arrangement of the invention, a floating body forming a part of an amphibious vehicle, a floating bridge, or a pontoon, thus presents the following advantages and capacities:

possibility of enlargement of the rolling path,
improvement of the hull profile,
presence of a raised part,
additional volume improving the buoyancy, and
compact storage position, integrated in the floating body.

The modifications of the floating bodies that are made in a folded-up or stored position can be carried out automatically.

A floating body incorporating the device of the invention thus comprises a bridge body or a floating body in one or two parts and, on each side of the latter, thus symmetrically, a movable lower hull which is extended upward by a movable raised part, movable flooring forming an enlargement of the circulation path of the floating body, and a bellows which enlarges the floating volume. The lower hull is formed by the first movable wall, which is articulated by means of a lower hinge to the body of the bridge, preferably to the lower part of the hull of the floating body. The raised part is formed by a second movable wall, which is articulated to the upper edge of the lower hull by means of an upper hinge. The flooring consists of a third movable wall, which is articulated to the raised part at a level which is higher than that of the upper hinge, so that the flooring can extend approximately in the same plane as that of the rolling path of the floating body when the device of the invention is fully deployed.

A more detailed description is provided below in reference to the drawings.

The movement between the folded-up position of the lower hull, of the raised part and of the flooring, and a position in which the latter are deployed, is carried out by means of an actuator, which is articulated to the bridge body and to the raised part, respectively. The deployment movement, notably the raising with respect to the lower hull, is limited by an abutment which is integral with the raised part.

The deployment of the movable walls can be carried out in different ways, essentially along the dimensions of the walls. Thus, in a first way, when the actuator is started, the lower hull is made to pivot about the lower hinge until it reaches an abutment, then the actuator causes the raised part to pivot about the upper hinge until the raised part reaches a corresponding abutment. In a second manner, the operation of the actuator first produces a pivoting of the lower hull, and then, when the lower hull has undergone part of its pivoting, the raised part starts to pivot, and the lower hull and the raised part pivot, each in its own way, until each reaches a corresponding abutment. The pivoting of the lower hull and then the pivoting of the raised part result in the displacement of the flooring and the opening of the bellows.

When the three movable walls are in the deployed position, different latching operations allow the securing of the flooring and the interlocking of the hull and the raised part. These latching operations are carried out preferably by movable or articulated hooks, as will be explained below with reference to the drawings.

Without going beyond the principle of the present invention, the mentioned means can be replaced, for example, as follows:

the actuator can be replaced with a threaded rod and nut, by a hoist and cable system, or by an inflatable fender, and the abutments can be replaced with connecting rod systems, cables or chains.

Obviously, the automatic pivoting system by means of actuators can be replaced with an entirely manual system.

Moreover, the fixing of the flooring in the deployed position can be combined with a guide wheel.

And the automatic deployment can be limited to the lower hull, while the pivoting of the raised part can be carried out manually.

Depending on the dimensions of the floating body and of the three movable walls, it is also possible to define two or three zones, and even four zones, in the axial direction of the floating bridge and to replace each one of the three movable walls by as many partial walls as there are defined zones.

BRIEF DESCRIPTION OF DRAWING FIGURES

Figure 9:
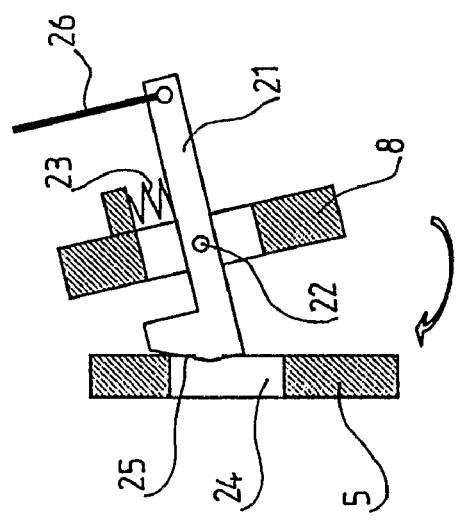
Figure 10:
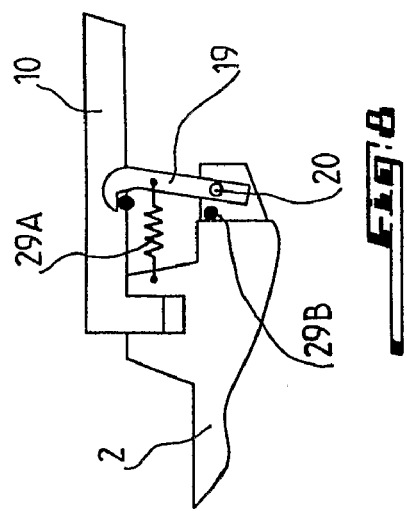
Figure 11:
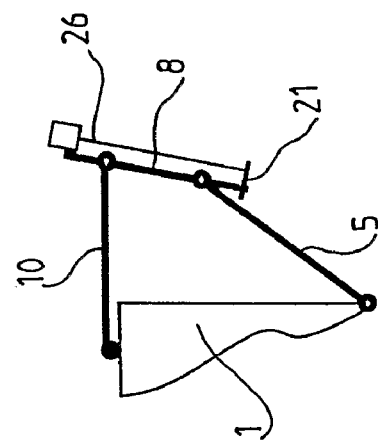
Figure 12:
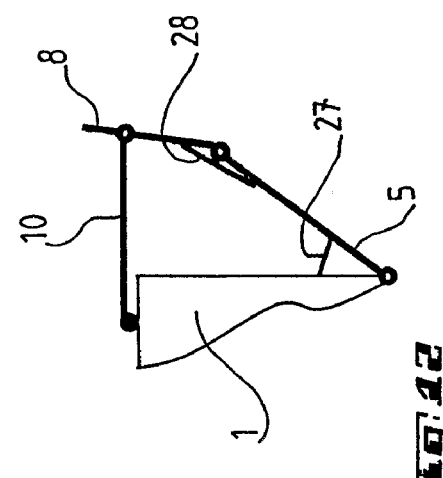

Other characteristics and advantages of the present invention will become clear in the following description of an embodiment of the device of the invention. The description is made with reference to the drawings, in which:

FIG. 1 represents a floating body in a perspective view with a device of the invention according to a preferred embodiment of the invention, FIG. 2 represents the floating body of FIG. 1 in the folded-up position, FIGS. 3-5 show schematically the movable walls in the folded-up position, in an intermediate position, and in the deployed position, FIG. 6 shows the articulation of the movable walls to the floating body, FIG. 7 shows an example of a mechanical abutment intended to limit the pivoting of the movable walls, FIGS. 8-10 represent latching means, and FIGS. 11-12 represent schematically means that can be used to replace the actuators and the abutments.

DETAILED DESCRIPTION

FIG. 1 shows a floating body comprising a device for modifying the hull according to the invention. The floating body is represented in the deployed position. The floating body comprises a base floating body 1, which is made of a single part and comprises an upper surface 2 forming a principal rolling path or a storage surface, as well as two lateral surfaces 3, 4, and front, back and lower surfaces, allowing the obtention of a sealed and floating body.

The floating body also comprises, on each side of the base floating body 1, a first movable wall 5, which is mounted so that it pivots on a lower part 6 of the corresponding lateral surface 3 of the base floating body 1 about a first axle 7, a second movable wall 8, which is mounted so that it pivots on the first movable wall 5 about a second axle 9, as well as a third movable wall 10, which is mounted so that it pivots on the second movable wall 8 about a third axle 11. The three axles 7, 9 and 11 are parallel to each other and also parallel to a longitudinal axis A of the principal rolling path 2. The three movable walls 5, 8 and 10 are arranged with respect to each other in such a manner that, in the folded-up position (see FIG. 2), the first movable wall 5 is arranged essentially parallel to the lateral wall 3 of the base floating body 1, and the second and third movable walls 8 and 10 partially cover the upper surface 2 of the base floating body 1. At the same time, the three movable walls 5, 8 and 10 are arranged with respect to each other in such a way that, in the deployed position, the first movable wall 5 delimits a volume V between it and the lateral surface 3 (see FIG. 5), the second movable wall 8 extends the first movable wall 5, and the third movable wall 10 forms an additional path broadening the upper surface 2 of the corresponding side.

In FIGS. 1 and 2, the movable walls 5, 8 and 10 are represented as consisting of three parts of approximately identical width, to facilitate the manipulation of the movable walls, and, especially, to be able to distribute the load more evenly over the drive means on both sides, represented here by three actuators 12.

As far as the dimensions of the movable walls and, more particularly, the height of the first movable wall 5 are concerned, this height is determined so that, in the folded-up position, the second axle 9 is arranged at a level which is higher than that to which the upper surface 2 extends, and so that, thanks to this arrangement, the second and the third movable walls 8 and 10 can rest essentially flat on the upper surface 2 of the base floating body 1.

The third axle 11 is separated from the second axle 9 by such a distance that, in the deployed position, the third movable wall 10 extends at least approximately in the same plane as the upper side 2.

As shown in FIGS. 3-5, a bellows 13 is attached between the lateral wall 3 of the base floating body 1 and the first movable wall 5. When the device of the invention is in the folded-up position, the bellows 13 is folded and by itself fills up at least part of the small space E that remains when the first movable wall 5 almost abuts against the lateral surface 3. When the movable walls move toward the deployed position, the bellows 13 is also deployed, and, when the device is fully deployed, the bellows 13 is entirely open and delimits, together with the lateral surface 3 and the first movable wall 5, a volume V for additional buoyancy. As shown, for example, in FIG. 5, bearings 17 located at the end of the third movable wall 10 facilitate the translation of the latter both during deployment and collapse of the movable walls.

FIGS. 6 and 7 show the drive system of the movable walls 5 and 8 by means of the actuator 12, without the movable wall 10. The actuator 12, which is represented here in a very simplified manner by only its movable rod terminating in a clevis 18, is housed in a recess 14 of the base floating body 1 and it is articulated, on the one hand, to the upper surface 2, and on the other hand, to the second movable wall 8 between the second axle 9 and the third axle 11. When the movable walls are in the folded-up position, this arrangement allows the actuator 12, once activated, to push the second movable wall 8 by translation toward the outside. This movement starts a pivoting of the first movable wall 5 up to a certain point, from which the second movable wall starts to pivot about the second axle 9. From this time on, the third movable wall 10 no longer moves in translation, but changes its motion into a mixed movement of translation and pivoting about the third axle 11, following the movement of the latter, which describes, in a first phase, an ascending movement, and then, towards the end of the movement, a descent to return to the initial level, so that the third movable wall 10 can come to a stop in a plane that is essentially parallel to that of the upper surface 2. FIG. 5 represents this final step and the deployed position for all three movable walls 5, 8 and 10.

FIG. 7, moreover, shows that the pivoting of the first movable wall 5 and the pivoting of the second movable wall 8 are each limited by abutments bearing the reference numerals 15 and 16 for the first wall 5 and for the second wall 8, respectively. In the second case, the abutments are mechanical of the covering type.

According to a variant—not shown in the drawing—it is also conceivable for the actuator 12 to be mounted not on the second movable wall 8, but on the first movable wall 5, directly below the second axle 9. Such an arrangement of the actuator 12 is advantageous if one wishes to benefit from the capacity for broadening the path of a floating bridge without each time lifting the second movable wall to obtain a raised part.

FIGS. 8-10 show automatic latching mechanisms used to latch the movable walls in the deployed position.

FIG. 8 shows the attachment of the third movable wall 10 on the upper surface 2 of the base floating body 1 by means of a hook 19. The hook 19 is advantageously prestressed by a twisted axle 20 and/or by a spring 29A. Although, in general, either one of these two prestressed means is provided, it is, technically speaking, not impossible to use the two simultaneously, if only to provide redundancy for better security of the attachment. When a spring 29A is provided, it is advantageously, but not necessarily, associated with an abutment 29B.

FIGS. 9 and 10 show a latching mechanism which is intended to latch the second movable wall 8, in the deployed position, to the first wall 5. This mechanism comprises essentially a hook 21 which is mounted so that it pivots on the second movable wall 8 by means of an axle 22 and is prestressed by means of a spring 23. When the second wall 8 approaches the first movable wall 5, the free head of the hook 21 is opposite an orifice 24 provided in the first movable wall 5 and is offset by the edge of the orifice 24 acting on a beveled surface 25 of the head of hook 21. The hook 21 is offset, and it penetrates, then traverses the orifice 24 when the hook has traversed the entire orifice 24 completely, and it resumes its initial position and thus latches the second movable wall 8 to the first movable wall 5. To unlatch these two walls, the hook 21 can be tilted by means of a cable 26 which acts against the force of the spring 23 to disengage the hook 21 and thus separate the first movable wall 5 from the second movable wall 8.

FIG. 11 represents the first movable wall 5 and the second movable wall 8 during deployment, close to the final deployment, with the latching means of FIGS. 9 and 10 represented in a simplified manner. The hook 21 approaches the engagement point.

FIG. 12 shows the use of connecting rods 27, 28 instead of abutments to limit the pivoting of the movable walls 5 and 8.

The invention claimed is:

1. A device for modifying a floating body base having an upper surface forming a principal rolling path and first and second lateral surfaces, the device comprising:
   on each side of the base floating body, a first movable wall, pivoting on a lower part of a corresponding lateral surface of the base floating body about a first axle,
   a second movable wall pivoting on the first movable wall about a second axle, and
   a third movable wall, pivoting about the second movable wall, about a third axle, wherein
      the first, second, and third axles are parallel to each other and to a longitudinal axis of the principal rolling path,
      the first, second, and third movable walls are arranged, with respect to each other, so that in a folded position, the first movable wall is essentially parallel to the first lateral surface of the base floating body, and the second and third movable walls partially cover the upper surface of the base floating body, and,
      in a deployed position, the first movable wall defines a volume between itself and the first lateral surface, the second movable wall extends the first movable wall, and the third movable wall forms an additional path, broadening the upper surface.

2. The device according to claim 1, wherein the first movable wall has a height so that, in the folded position, the second axle is at a level higher than the upper surface, and the second and the third movable walls rest upon the upper surface.

3. The device according to claim 1, wherein the third axle is separated from the second axle so that, in the deployed position, the third movable wall is approximately in the same plane as the upper surface.

4. The device according to claim 1, including, on each side of the base floating body, an actuator for deployment and collapse of the first movable wall.

5. The device according to claim 1, including, on each side of the base floating body, an actuator for deployment and collapse of the first, second, and third movable walls.

6. The device according to claim 1, wherein the second movable wall constitutes a raised part of a hull of the floating body base.

7. The device according to claim 1, wherein the second movable wall comprises an abutment limiting pivoting of the second movable wall, with respect to the first movable wall, during deployment.

8. The device according to claim 4, wherein the actuators are articulated to the base floating body and the second movable wall through respective clevises.

9. The device according to claim 1, wherein the first and second movable walls comprise an automatic latching mechanism for latching the first and second walls to each other in the deployed position.

10. The device according to claim 1, comprising a latching mechanism for latching the third movable wall to the upper surface in the deployed position.

11. The device according to claim 1, comprising bellows which is fixed between the first movable wall and the base floating body so that a volume enclosed between the first movable wall and the lateral surface is floating.

* * * * *